United States Patent [19]
Jones

[11] Patent Number: 4,767,093
[45] Date of Patent: Aug. 30, 1988

[54] COPYHOLDER

[75] Inventor: Hwfa J. Jones, 47 Penkett Road, Wallasey, Wirral, Merseyside, England

[73] Assignees: Hwfa John Jones, Wirral; Robert T. Glynn, New Brighton; Joseph Barnes, Wirral, all of England

[21] Appl. No.: 26,686

[22] Filed: Mar. 17, 1987

[30] Foreign Application Priority Data

Mar. 17, 1986 [GB] United Kingdom ............... 8606515

[51] Int. Cl.$^4$ .............................................. B41T 29/00
[52] U.S. Cl. ........................... 248/442.2; 248/205.2; 248/205.3; 248/206.5; 248/447.1; 248/452; 400/718; D19/88; D19/91
[58] Field of Search ............... 248/1, 1 B, 1 A, 442.2, 248/206.5, 451, 452, 441.1, 205.3, 205.2, 447.1; 400/718, 718.1, 718.2; D9/91, 88, 90

[56] References Cited

U.S. PATENT DOCUMENTS

| | | | |
|---|---|---|---|
| 728,613 | 5/1903 | Price | 400/718 |
| 1,361,574 | 12/1920 | Frater, Jr. | 248/300 |
| 3,273,891 | 9/1966 | Grim, Jr. | 248/205.2 X |
| 3,918,668 | 11/1975 | Thorpe | 248/205.3 |
| 4,243,249 | 1/1981 | Goss | D19/88 X |
| 4,276,821 | 7/1981 | Brown | 248/206.5 X |
| 4,632,471 | 12/1986 | Visnapuu | 248/442.2 X |
| 4,693,443 | 9/1987 | Drain | 211/89 X |

OTHER PUBLICATIONS

"Space-Saving Copyholder", Global Computer Supplies, Plainview NY, 1986, p. 16, Box C44.

Primary Examiner—David L. Talbott
Attorney, Agent, or Firm—Dennison, Meserole, Pollack & Scheiner

[57] ABSTRACT

A copyholder device 11 for supporting at least one sheet comprises an elongate strip 12 of plastics material divided into a first arm portion 13 for receiving a sheet and a second arm portion 14 having hook and loop attachment means (Velcro) 15, 15' for enabling said elongate strip 12 to be attached to a surface of an apparatus, said first arm portion 13 having holding or gripping means 16 for securing and suspending at least one sheet from said first arm portion 13 with said first arm portion 13 being such that, in use, it extends beyond the side of said surface; wherein said strip 12 is divided into the two arm portions by being twisted at 17 about its longitudinal axis so that, in the position of use, said first arm portion 13 lies in an obliquely angled (angle B) or substantially vertical plane when said second arm portion 14 lies in a horizontal or substantially horizontal plane. Preferably, the portion 13 is inclined at angle A to portion 14.

7 Claims, 2 Drawing Sheets

COPYHOLDER

The present invention relates to a copyholder for supporting copy or notes to be typed on, for example, a personal computer, word processor, typewriter etc.

Copyholders are used to support copy or notes in a position where the contents can be easily read by a typist, whilst typing them on a keyboard. It should not be under estimated how useful copyholders are. Copy which is badly positioned can give the typist a great deal of physical discomfort and result in a reduction in the typist's speed.

A variety of copyholders are known, including desk rested copyholders and flexible arm copyholders which support the copy on the end of a flexible arm clamped to an edge of the typist's desk or a shelf. A further type of copyholder is also known which is attached to the typist's equipment, and it is to this type of copyholder that the present invention relates. These copyholders comprise a pad which can be attached to the side of the typist's equipment and an arm which is connected to the pad so as to extend in use, to the side of the typist's equipment. More ofter than not these copyholders are used with wordprocessors and personal computers, where the copy typed appears on a visual display unit, and the copyholder is attached to the side of the visual display unit.

In order to prevent the arm from sagging under its own weight, and that of any copy it is carrying, its connection with the attaching pad must be quite substantial. This results in a copyholder which is bulky and unpleasing visually and more significantly, comparatively expensive.

It is an object of the present invention to provide a copyholder for supporting copy or notes which can be attached to a typist's equipment and which obviates or mitigates the need for a substantial connection between a copy supporting arm and means for securing the copyholder to a typist's equipment.

According to the present invention there is provided a copyholder for supporting copy or notes comprising attachment means for attaching the copyholder to a surface, a substantially blade like arm connected to the attachment means so as to extend in use beyond the side of the said surface and fastening means carried by the said arm for securing copy or notes thereto, characterised in that the said arm is twisted about its longitudinal axis relative to the attachment means so as to lie in an obliquely angled or substantially vertical plane relative to the horizontal.

With the said arm twisted relative to the attachment means so as to lie in an obliquely angled or substantially vertical plane the likelihood of it sagging towards the end is considerably reduced. Moreover, the twisted portion between the said arm and the attachment means effectively increases the width of the said arm where it joins the attachment means, thus increasing its resistance to bend at this point. Furthermore, by attaching the copyholder such that the twisted portion lies against a substantially vertical surface or edge the said arm is braced by the twisted portion against this vertical surface or edge.

Preferably, the said arm is connected to a second arm which carries the attachment means. The attachment means may comprise two strips of hook and loop fastening means known by the trademark VELCRO one of which is secured to the said second arm and the other one of which is secured to the surface to which the copyholder is to be attached. The use of hook and loop fastening means allows the copyholder to be releasably attached to a typist's equipment. As an alternative, the attachment means may comprise a strip of double sided sticky tape, although this does not easily lend itself to releasably attaching the copyholder to a typist's equipment. As yet another alternative, the attachment means may comprise a magnetic pad secured to the second arm. This alternative allows the copyholder to be attached to almost any metal surface.

The fastening means may comprise a clip, such as a bulldog clip. Alternatively, the fastening means may comprise a spring loaded or an elasticated rule, extending the length of the said arm. The copy or notes can be slipped under the rule and can be moved upwards or downwards under the rule so that the line being read is underlined.

In one preferred embodiment of the present invention the said arm supporting the copy and the said second arm carrying the fastening means both lie in a substantially horizontal plane. In use the said second arm is attached to a substantially horizontal surface, such as the top of a visual display unit, with the twisted portion between the said arm and the said second arm positioned against the side of the edge of the surface so as to be braced against it.

In another preferred embodiment of the present invention the said arm supporting the copy and the said second arm carrying the fastening means are arranged substantially perpendicular to each other. In use the said second arm is attached to a substantially vertical surface, such as the side of a visual display unit and as in the previous embodiment the twisted portion between the said arm and the second arm braces the second arm against the side of the surface.

Preferably, the copyholder is fabricated from a thin elongate strip of plastics material.

Preferably, the said arm is angled relative to the attachment means in a substantially horizontal plane, so that when the copyholder is attached to a surface the far end of the said second arm is angled towards the typist.

Also according to the present invention there is provided a device for supporting at least one sheet comprising an elongate member divided into a first arm member or portion for receiving a sheet and a second arm member or portion having attachment means for enabling said elongate member to be attached to a surface of an apparatus, said first arm member or portion having holding or gripping means for securing and suspending at least one sheet from said first arm member or portion with said first arm member or portion being such that, in use, it extends beyond the side of said surface; wherein said member is divided into the two arm members or portions by being twisted about its longitudinal axis so that, in the position of use, said first arm member or portion lies in an obliquely angled or substantially vertical plane when said second arm member or portion lies in a horizontal or substantially horizontal plane.

Embodiments of the present invention will now be described, by way of example, with reference to the accompanying drawings, in which.

Figure 1:
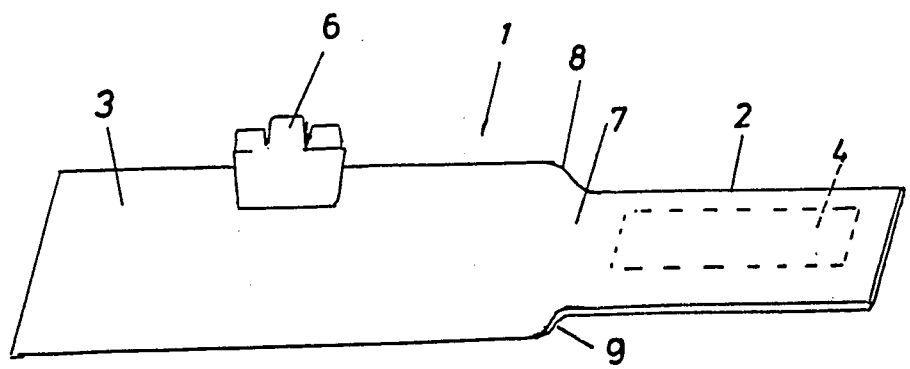
FIG. 1 is a schematic perspective view of a copyholder according to a first embodiment of the present invention.
Figure 2:
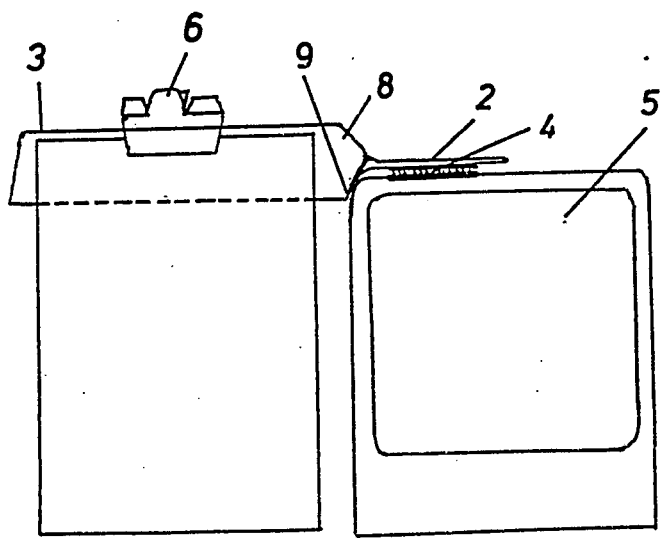
FIG. 2 shows the copyholder of FIG. 1 attached to a monitor.
Figure 3:
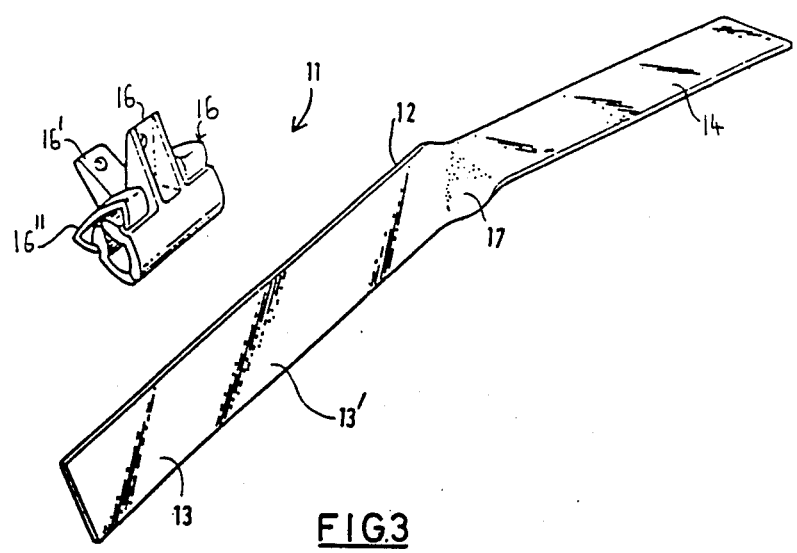
FIG. 3 is a perspective view of a preferred embodiment of the invention similar to that of FIGS. 1 and 2.
Figure 4:
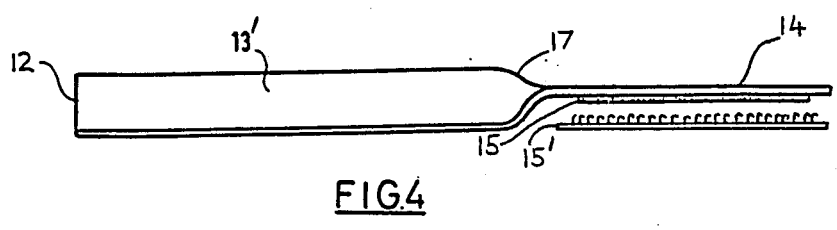
FIGS. 4, 5 and 6 are respectively a front elevation, plan view and inverted plan view of the support device of FIG. 3 without gripping means.
Figure 5:
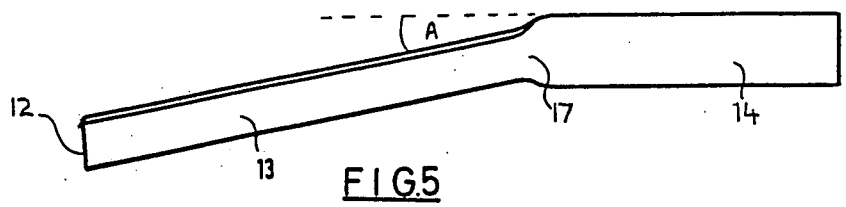
Figure 6:
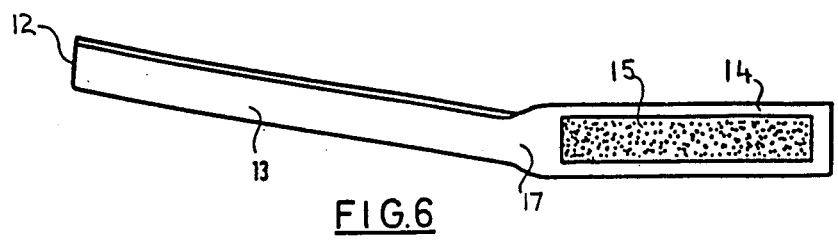
Figure 7:
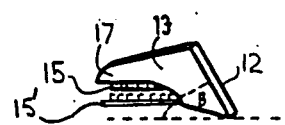
FIGS. 7 and 8 are respectively views from the left-hand end and right-hand end of the device shown in FIG. 4.
Figure 8:
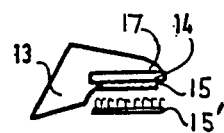

Referring to the accompanying drawings there is shown a copyholder according to the present invention comprising a thin elongate strip 1 of plastics material which is divided into two arms 2 and 3. Arm 2 carries a strip of hook and loop fastening means which allows it to be attached to a surface which has likewise, had a strip of hook and loop fastening means secured to it. By way of example, FIG. 2 shows arm 2 attached to the top of a visual display unit. 5. Arm 3 carries a bulldog clip 6 which allows sheets or pads of copy or notes to be clipped to it. In order to make viewing of copy or notes carried by the arm 3 easier arm 3 is angled slightly forward relative to arm 2 in a horizontal plane, thus bringing the furthest end of it towards a typist sitting in front of the visual display unit 5.

Arm 2 lies in a substantial horizontal plane, thus facilitating its attachment to the top of the visual display unit 5, whilst arm 3 is twisted about its longitudinal; axis relative to arm 2 so as to define an obliquely angled surface which slopes upwards away from the front of the visual display unit 5. The twist between the two arms 2 and 3, results in a twist section 7, and this in turn defines a substantially vertical wing 8, 9 on each side of the central axis of the arm 2, one of which 8 extends upwardly and the other 9 downwardly.

In use the copyholder is attached to the top of the visual display unit 5 with the twisted section 7 over the edge of the visual display unit 5. In this position the downwardly extending wing 9 abuts against the side of the visual display unit 5, bracing the arm 3 and preventing it from sagging downward under its own weight and that of any copy carried by it. As a result of the arm 3 being twisted upwardly its effective thickness is much greater than would be the case if it was formed by a simple horizontal extension of the arm 2 and this further contributes to the strength of the arm 3, reducing the likelihood of it sagging downwardly towards its extreme end.

In an alternative embodiment of the present invention the arm 2 is disposed vertically relative to the arm 3, thereby forming a right angled bracket. As in the previously described embodiment of the present invention the arm 3 is twisted so as to lie in an obliquely angled plane relative to the horizontal, thereby giving the arm 3 a degree of strength which would not be present in a simply horizontal orientated arm, whilst maintaining a slimline appearance for the copyholder. This embodiment of the invention is intended to be attached to a vertical surface, such as the side of a typist's equipment.

Being comprised of a simple elongate strip of plastics material the copyholder according to the present invention is extremely cheap and yet despite its apparent flimisiness the arm which supports copy or notes has a great deal of strength and does not sag towards its extreme end. Moreover, the twisted section between the copy supporting arm and the attachment arm, bracing as it does against the edge or side of the surface to which the copyholder is attached braces the copy supporting arm and further resists sagging. In the prior art this problem has only been overcome by fabricating the copyholder with a very substantial arm and a substantial connection between the arm and the attachment means by which it is attached to a surface.

In FIGS. 3 to 8 there is illustrated a copyholder or device for supporting at least one sheet of, for example, paper and comprises an elongate member 12 formed from a thin strip of plastics material and divided into a first arm portion 13 for receiving the top edge of a sheet (not shown) and a second arm portion 14 having attachment means 15 for enabling said elongate member 12 to be attached to a surface of an apparatus (not shown).

The attachment means is a releaseable attachment means formed by hook and loop fastening means 15, 15' such as sold under the Trade Mark "Velcro" with one sheet 15 thereof e.g. the loop sheet, being bonded to the lower surface of second arm portion 14 and the other sheet 15' the fastening means, e.g. the "hook" sheet, having an adhesive applied to its normally lower side with a release sheet (not shown) thereover which is removable to permit the sheet to be attached to a surface such as a VDU screen (not shown).

The first arm portion 13 has holding or gripping means in the form of a clip device 16 resiliently biassed into the closed or gripping position and engageable against opposite faces of arm portion 13 and to grip a sheet against the front surface 13'.

The clip device 16 comprises two pivoted gripping jaws with manually engageable lugs 16' with two resilient plastics material clips 16" biassing the jaws into the closed position and may be such as sold under the name "colour clip" by Myers of Birmingham.

The first arm portion 13 is such that, in use, it extends beyond the side of its support surface (not shown—see FIG. 2). The elongate member 12 is divided into the two arm portions 13, 14 by being formed from a straight strip by being twisted at 17 about its longitudinal axis so that, in the position of use, said first arm portion 13 lies in an obliquely angled (or substantially vertical plane) when said second arm portion 14 lies in a horizontal or substantially horizontal plane—as shown.

The first arm portion 13 is angled at angle A in a substantially horizontal plane relative to the second arm portion 14 so that, in use (see FIG. 2), when the device 11 is attached to a surface, the first arm portion 13 extends from the twisted portion 17 in cantilever manner towards the reader and apparatus user.

Various modifications and improvements may be made without departing from the present invention defined in the appended claims. For example the holding or gripping means may be an integrally moulded or permanently attached part of the device such as a part of the first arm portion.

Angle A may be anything from 0° to generally 45° but is preferably about 20°. Angle B will be anything from generally 30° to 90° but is preferably approximately 50°.

I claim:

1. A copyholder for supporting at least one paper sheet adjacent an office machine comprising an elongated bladelike body of strip material, said body including first and second arm portions interconnected by a section twisted about the longitudinal axis of said body and configured to establish a preselected angular relationship between said first and second arms portions substantially along the longitudinal axis of said body, attachment means on one of said arm portions engageable with said office machine for securing said copyholder thereto, and holding means on the other of said arm portions for supporting said paper sheet thereon.

2. The copyholder defined by claim 1 wherein said attachment means is a releasable hook and loop type fastener.

3. The copyholder defined by claim 1 wherein said attachment means is double-sided adhesive tape.

4. The copyholder defined by claim 1 wherein said attachment means is a magnetic element.

5. The copyholder of claim 1 wherein said paper holding means is a spring-biased pivotal jaw clamp.

6. The copyholder defined by claim 1 wherein both arms have a common longitudinal axis.

7. The copyholder of claim 1 wherein said arms have intersecting longitudinal axes.

* * * * *